United States Patent [19]
Rogic et al.

[11] 3,857,510
[45] Dec. 31, 1974

[54] KETONE CLEAVAGE AND PRODUCTS THEREFROM

[75] Inventors: Milorad M. Rogic, Wippany; Robert Fuhrmann, Morris Plains, both of N.J.

[73] Assignee: Allied Chemical Corporation, New York, N.Y.

[22] Filed: Sept. 1, 1972

[21] Appl. No.: 285,681

Related U.S. Application Data

[63] Continuation-in-part of Ser. No. 189,373, Oct. 14, 1971.

[52] U.S. Cl. ... 230/239.3 A, 260/482 R, 260/482 C, 260/534 R
[51] Int. Cl. ............................................ C07d 53/06
[58] Field of Search ..... 260/239.3 A, 534 R, 482 A, 260/482 C

[56] References Cited
UNITED STATES PATENTS

| | | | |
|---|---|---|---|
| 2,956,051 | 10/1960 | Duxbury et al. | 260/239.3 A |
| 3,215,730 | 11/1965 | Spathe et al. | 260/482 R |
| 3,356,698 | 12/1967 | Lafont et al. | 260/534 R |
| 3,485,821 | 12/1969 | Sheehan | 260/239.3 A |

OTHER PUBLICATIONS

Fieser et al. "Organic Chemistry" 3rd Ed. pages 174–176 Reinhold, 1956.

*Primary Examiner*—Henry R. Jiles
*Assistant Examiner*—Robert T. Bond
*Attorney, Agent, or Firm*—Robert A. Harman; Arthur J. Plantamura

[57] ABSTRACT

A method of cleaving ketones at a carbon-carbon bond adjacent to the ketonic carbon to produce a terminal carboxylic ester and a terminal oxime group, which comprises, nitrosating the ketone in the presence of a polar aprotic solvent and an alcohol. The products are useful intermediates, particularly as intermediates in the production of polyamides, and as solvents. A method of synthesizing ε-caprolactam from the intermediate ω-hydroximino hexanoate, produced by cleaving cyclohexanone, hydrogenating the intermediate ω-aminohexanoate ester and cyclizing the corresponding ester thus formed, to ε-caprolactam.

26 Claims, No Drawings

KETONE CLEAVAGE AND PRODUCTS THEREFROM

CROSS-REFERENCE TO RELATED APPLICATION

This application is a continuation-in-part of the copending application in the name of the same inventors, Ser. No. 189,373, filed Oct. 14, 1971 and entitled: "Synthesis of ε-Caprolactam".

BACKGROUND OF THE INVENTION

This invention relates to a method for cleaving the carbon-carbon bond adjacent to a ketonic carbon, with a nitrosating agent. The products are useful as intermediates, particularly in the production of monomers such as ε-caprolactam, which may be polymerized to form various polyamides. They are also of value as solvents.

SUMMARY OF THE INVENTION

The present invention is directed to a method of cleaving ketones at a C-C bond adjacent to the ketonic carbon to produce a terminal carboxylic acid ester group and a terminal oxime group, which comprises admixing a ketone of the formula $$\begin{array}{c} R^1-C^1=O \\ | \\ R^2-C^2-H \\ | \\ R^3 \end{array},$$

wherein $R^1$ and $R^2$ can each be an aliphatic or cyclic hydrocarbon radical containing 1 to 20 carbon atoms, or $R^1$ together with $R^2$ forms a cyclic hydrocarbon radical, and $R^3$ can be H, an aliphatic or a cyclic radical, with a nitrosating agent in the presence of a polar aprotic solvent having a dielectric constant of at least about 12, and an alcohol, for a time sufficient to effect scission at the $C^1$-$C^2$ carbon bond, and to produce a carboxylic ester group at the $C^1$ carbon, and an oxime group at the $C^2$ carbon.

When the ketone is cyclohexanone, the reaction product is ω-hydroximino-hexanoate.

A method of cleaving cyclohexanone therefore comprises nitrosating cyclohexanone in the presence of an alcohol and a polar aprotic solvent to produce ω-hydroximino hexanoate as a reaction product. Hydrogenating the ω-hydroximino hexanoate in the presence of a reduction catalyst produces the corresponding ω-aminohexanoate ester which is then cyclized to produce ε-caprolactam.

DETAILED DESCRIPTION OF THE INVENTION

Cleavage in accordance with this invention transforms the ketonic carbon into a terminal carboxylic acid ester group, the adjacent carbon becoming a part of an oxime group.

Ketones of the general formula, undergo cleavage of the

bond when reacted with a nitrosating agent in a polar aprotic solvent having a dielectric constant of at least about 12, and in the presence of an alcohol. A generic representation of the reaction is given below when $R^1$ and $R^2$ are each either an aliphatic or cyclic hydrocarbon radical containing 1 to 20 carbon atoms, and $R^3$ is H, an aliphatic or a cyclic hydrocarbon radical also containing 1 to 20 carbon atoms.

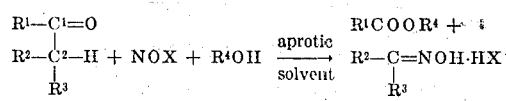

X represents the acid radical of the nitrosating agent NOX, and $R^4$ is the hydrocarbon radical of an alkanol, cycloalkanol or aralkyl alcohol having 1 to 12 carbon atoms.

In the case of cyclic ketones, the general reaction can be represented as follows, Cn being a hydrocarbon radical of 2 to 20 carbon atoms.

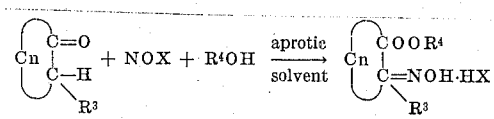

Nitrosolysis of cyclic ketones produces the corresponding ω-oximino acid esters. Open chain ketones, however, generally cleave to produce the corresponding alkyl carboxylic acid ester, and one or more alkyloximes.

When a symmetrical aliphatic or substituted aliphatic ketone is the starting material, cleavage of the carbon-carbon bond adjacent to the ketonic carbon first results, and only a single ester and a single oxime are produced. For example, using di-n-propyl ketone, the following products will be formed.

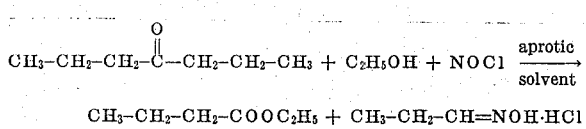

It will be noted that the ketonic carbon becomes part of a carboxylic ester group, and the adjacent carbon atom in the starting ketone ($C^2$) becomes part of an oxime group, usually as the salt of the acid corresponding to the nitrosating agent. In this example, since nitrosyl chloride was used, the oxime will be present as a hydrochloride. Generally, in the case of aliphatic open chain ketones, the carboxylic acid ester can be isolated as formed; whereas the oximes usually react further to produce various by-products. The aliphatic carboxylic acid esters are well known compounds having utility in many fields. The oximes, or the corresponding by-products obtained therefrom, may be separated by conventional methods and have value as intermediates, their nature of course being dependent on the aliphatic ketone selected as the raw material.

If an unsymmetrical ketone, either cyclic or aliphatic, is the starting material, the bond between the ketonic carbon and either adjacent carbon can be broken. This is illustrated by the reaction of 2-methylcyclohexanone and 3-heptanone, using nitrosyl bromide as the nitrosating agent, and methanol as the alcohol.

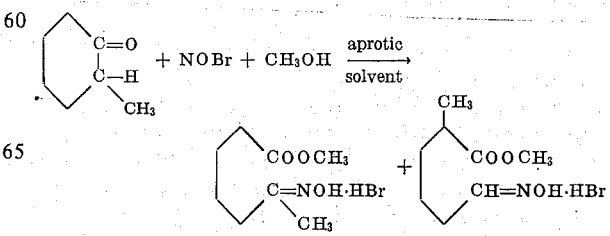

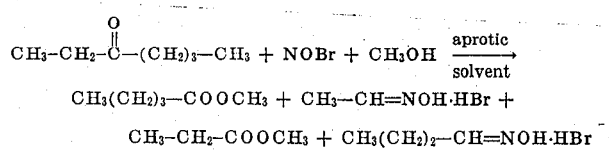

$$CH_3(CH_2)_3-COOCH_3 + CH_3-CH=NOH \cdot HBr +$$
$$CH_3-CH_2-COOCH_3 + CH_3(CH_2)_2-CH=NOH \cdot HBr$$

As previously mentioned, in the case of aliphatic ketones, the oximes will generally react further.

The process of this invention may be used to particular advantage in the case of cyclic ketones, where a single product of value is obtained. For example, when cyclohexanone is cleaved, using nitrosyl chloride as the nitrosating agent, an alcohol ROH and liquid sulfur dioxide as the aprotic solvent having a dielectric constant of about 12

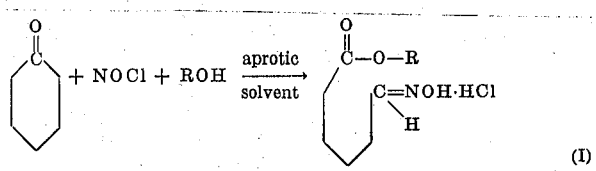

(I)

The corresponding ω-hydroximinohexanoate R ester is obtained in high yield.

It is important to the success of the method of our invention that an aprotic solvent be employed having a dielectric constant of at least about 12. If solvents having substantially lower dielectric constants are employed, we have found that either the desired reaction does not take place, or numerous side products are also formed, thus making product isolation difficult, and providing poor yields. Liquid sulfur dioxide is the recommended solvent although others may be used to good advantage.

Among the many nitrosating agents that can be used are the nitrosyl halides, such as NOCl, NOBr, and NOI; nitrosyl formate, nitrosyl acetate, nitrosyl fluoborate. A desired nitrosating agent can be formed by the reaction of an alkyl nitrite and a strong mineral acid. Alkyl nitrites can be produced by the reaction of $N_2O_3$, $NO + O_2$, $NO + NO_2$, etc., with an alcohol. Alternatively, the nitrosating agent can be formed in situ by adding an alkyl nitrite and a strong mineral acid to the reaction mix. Preferably, the alcohol should be the same as that used in the reaction otherwise a mixture of ω-hydroximino esters is formed corresponding to the two different alcohols present. Although many nitrosating agents may be used with satisfactory results, nitrosyl chloride is the recommended agent.

The alcohol which is used, according to the process of the present invention, and which enters into the reaction by supplying the "$R^4$" radical of the generic reaction previously given, may be an alkanol, cycloalkanol or aralkyl alcohol having 1 to 12 carbon atoms inclusive. Preferably, an aliphatic alcohol, such as methanol, ethanol, isopropanol, butanol, or isoamyl alcohol having 1 to 5 carbon atoms inclusive, is employed, and still more desirably, methanol or ethanol because of their low cost and high volatility. The purpose of the alcohol is to participate in the cleavage of the bond between the ketonic carbon atom and either adjacent carbon atom to form the ester of the resulting acid. In the absence of alcohol, the cleavage of the carbon-carbon bond does not occur.

The reaction is carried out in an aprotic solvent having a dielectric constant of about 12, such as sulfur dioxide, or more polar solvents such as sulfolane, nitromethane, and nitrobenzene. The preferred solvent is liquid sulfur dioxide. The quantity of solvent used is not critical providing there is sufficient solvent present to dissolve all the reactants. Greater amounts of solvent are not harmful but serve no useful purpose, and all the solvent must, of course, ultimately be separated from the reaction product. The reaction is exothermic and takes place substantially as fast as the reactants are mixed so that the time of reaction is not critical. Prolonged contacting of the reactants is not harmful but serves no useful purpose. Preferably the ketone will first be dissolved in the solvent and the nitrosating agent then added. The alcohol may be either dissolved in the solvent or added thereto regardless of whether the ketone or nitrosating agent is being added to the solvent solution of the other. Preferably, at least one mole of nitrosating agent and of alcohol should be present for each mole of ketone being nitrosated. The presence of substantially more than one mole of alcohol per mole of ketone is not harmful but serves no useful purpose. A large excess of nitrosating agent is undesirable since it can result in the formation of side products.

The temperature at which the reaction is carried out is largely controlled by the choice of ketone, nitrosating agent, and particularly the choice of solvent. When the preferred solvent and nitrosating agent are used, the temperature can range between −80°C. and +60°C., with a preferred range of −30°C. to +50°C. Since the reaction is exothermic, it may be carried out with appropriate cooling, or alternately, under autogenous pressures.

The product mixture is separated from the reaction mixture by vaporizing the solvents. When the nitrosating agent is a nitrosyl halide or other nitrosating agent having a strongly acidic component, the corresponding oximino compound can either be neutralized, as with an alkali, or washed with water. More effective washing is obtained if the product is dissolved in an appropriate solvent substantially immiscible with water, washed with water until free of acid, and separated therefrom by vaporizating the solvent. Suitable water-immiscible solvents are the chlorinated aliphatic hydrocarbons, aromatic hydrocarbons and the like. Benzene and chloroform serve nicely for this purpose. Previously, the cleavage of cyclohexanone was given as an example of the cleavage of a cyclic ketone by the process of this invention. The ω-hydroximinohexanoate ester I, is obtained as the product of this cleavage reaction in good yield.

This product, isolated and neutralized as just explained, is then catalytically hydrogenated to afford the corresponding ω-amino compound (II)

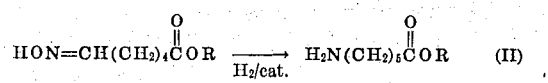 (II)

The hydrogenation catalyst can be any of the known catalysts which will effect reduction of the

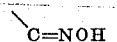

moiety to

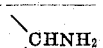

without concomitant reduction of the ester moiety. We have found Raney nickel or copper or cobalt to be the most effective and selective catalysts in this regard, although other catalysts known to the art are suitable. Hydrogen pressures and temperatures are not critical, pressures of 100 to 10,000 psig and temperatures of 25°C. to 300°C. being most suitable. Higher or lower pressures and temperatures are usable but do not increase the yield of product (II), which generally is substantially quantitative. To facilitate the contacting of the intermediate product (I) with the hydrogenation catalyst, the ω-hydroximinohexanoate ester is preferably dissolved in a substantially inert solvent, such as a 1 to 3 carbon alkanol, a 4 to 8 carbon mono or diether such as diethyl ether, glyme, diglyme, or diethylcarbitol, benzene, an alkyl aromatic solvent, such as toluene or liquid ammonia. Liquid ammonia is preferred. If one of the other above-enumerated solvents is utilized, it is desirable to add a catalytic amount of ammonia which we have found facilitates the hydrogenation. After reduction is complete which can be readily ascertained by noting the cessation of hydrogen uptake, the catalyst is separated as by filtration and the solution containing the ω-aminohexanoate ester (Compound II) is then evaporated, affording the essentially pure ester as a residue.

Cyclization of (II) to afford ε-caprolactam is most readily effected by heating an aqueous solution thereof.

A suitable cyclization temperature is from about 200°C. up to about 350°C. which requires the use of a pressure vessel. The cyclization is rapid and is ordinarily complete within a few minutes. The alcohol

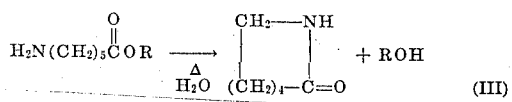

(ROH) and water are then separated from (III) by fractionally distilling the aqueous solution after cyclization is complete. The distilled ε-caprolactam is of excellent purity and can be polymerized to produce nylon 6. The water and alcohol can be recycled if desired.

The invention can be more fully understood by reference to the following examples.

EXAMPLE 1

100 Parts of dry $SO_2$ were distilled into a glass vessel equipped with a dry-ice condenser, thermometer, inlet tube and mechanical agitator. A solution of 20 parts of cyclohexanone and 16.5 parts of methanol were then added, and 14.5 parts of nitrosyl chloride vapor gradually introduced through the inlet tube. The nitrosyl chloride vapor was decolorized almost as rapidly as it was introduced. The temperature of the reaction vessel rose to about −10°C. and was maintained at about this temperature throughout the nitrosyl chloride addition by controlling the addition rate. The reaction was considered complete when the nitrosyl chloride did not decolorize. The reaction mixture was then stripped by permitting the temperature of rise spontaneously under reduced pressure, leaving as product, a viscous, yellowish, oil residue which solidified on standing. Although the $SO_2$ was removed under reduced pressure, this is not necessary. Permitting the mixture to warm spontaneously at atmospheric pressure is quite satisfactory. This residue was dissolved in a slight excess of chloroform and washed with cold water. The chloroform layer was separated and evaporated under reduced pressure leaving a pale yellow liquid which solidified on standing. Gas chromatography, nuclear magnetic resonance (NMR) and infrared spectographic analysis (IR) indicated the product to be an approximately 1:1 mixture of the two isomeric ω-oximino methyl caproates. A product yield of 90 percent of theory was obtained.

Using the same procedure, several other cyclic ketones were converted into the corresponding ω-oximino esters. The yields obtained are tabulated in Table I, below:

TABLE I

Nitrosolysis of various cyclic ketones by reaction with nitrosyl chloride in sulfur dioxide in the presence of ethanol at about −10°C.

| Ketone | ω-oximino ester | Yield, % |
|---|---|---|
| cyclopentanone | $HON=CH(CH_2)_3COOC_2H_5$ | 75 |
| cyclohexanone | $HON=CH(CH_2)_4COOC_2H_5$ | 95 |
| 2-methylcyclohexanone | $HON=CH(CH_2)_3CH(CH_3)COOC_2H_5$ | 43 |
| 4-t-butylcyclohexanone | $HON=C(CH_3)(CH_2)_4COOC_2H_5$ | 42 |
| | $HON=CHCH_2CH(C(CH_3)_3)CH_2CH_2COOC_2H_5$ | 50 |
| cyclooctanone | $HON=CH(CH_2)_6COOC_2H_5$ | 85 |
| cyclododecanone | $HON=CH(CH_2)_{10}COOC_2H_5$ | 70 |

EXAMPLE 2

Two open-chain ketones were subjected to the same procedure as that given for Example 1. In each case the corresponding carboxylic acid ester was obtained in good yield. The alkyl oximes obtained reacted further to give several byproducts which were not identified. The results are tabulated in Table II below.

TABLE II

Nitrosolysis of open-chain ketones in sulfur dioxide and in the presence of ethanol at about −10°C.

| Ketone | Product | Yield, % |
|---|---|---|
| 4-heptanone | $CH_3CH_2CH_2COOC_2H_5$ $CH_3CH_2CH=NOH$ (reacted further) | 95 |
| 7-tridecanone | $CH_3(CH_2)_5COOC_2H_5$ $CH_3(CH_2)_4CH=NOH$ (reacted further) | 90 |

EXAMPLE 3

Various alcohols can be used as illustrated by reaction of cyclohexanone under the same reaction conditions as those given for Example 1. The results are tabulated in Table III, below:

TABLE III

Nitrosolysis of cyclohexanone with nitrosyl chloride in the presence of various alcohols.

| Alcohol | Product | Yield, percent |
|---|---|---|
| $CH_3OH$ | $HON=CH(CH_2)_4COOCH_3$ | 95 |
| $CH_3CH_2OH$ | $HON=CH(CH_2)_4COOC_2H_5$ | 95 |
| $CH_3CH_2CH_2OH$ | $HON=CH(CH_2)_4COOC_3H_7$ | 90 |
| $(CH_3)_2CHCH_2OH$ | $HON=CH(CH_2)_4COOCH_2CH(CH_3)_2$ | 83 |
| $(CH_3)_2CHOH$ | $HON=CH(CH_2)_4COOCH(CH_3)_2$ | 56 |
| ⬡-OH | $HON=CH(CH_2)_4COO-$⬡ | 40 |

EXAMPLE 4

Although $SO_2$ is the preferred solvent, other polar aprotic solvents can be used as illustrated in Table IV, below. In this example, cyclohexanone was cleaved with nitrosyl chloride in the presence of ethanol at room temperature. Various solvents were used, but in all other respects than those here given, the procedure was identical to that given for Example 1.

TABLE IV

Nitrosolysis of cyclohexanone with nitrosyl chloride in the presence of ethanol and various solvents.

| Solvent | ω-oximino ethylcaproate, % |
|---|---|
| sulfur dioxide | 95 |
| sulfolane | 80 |
| nitromethane | 78 |
| nitrobenzene | 50 |
| diglyme | 10* |
| methylene chloride | 10* |

*These yields were estimated in the impure product obtained; the main product was 2,6-dioximino cyclohexanone.

EXAMPLE 5

This example illustrates a method of hydrogenating the ω-hydroximino hexanoate, or more specifically, the ω-oximino methyl caproate, prepared by cleaving cyclohexanone by the method of the present invention. The raw material used was that prepared in Example 1 wherein the alcohol used in the nitrosation reaction was methanol.

10 Parts by weight of ω-oximino methyl caproate were placed in a pressure vessel and 25 parts of liquid ammonia and 0.1 part of Raney nickel added. The vessel was then pressurized to 1,000 psig with hydrogen, sealed and agitated in a rocker at 70°C. for four hours. The reaction mixture was then stripped to remove ammonia, dissolved in ether, filtered, and stripped again affording an essentially quantitative yield of the ω-aminohexanoate methyl ester, ω-amino methyl caproate. The product's structure was verified by the following procedure. A concentrated solution of the amino ester in methanol was saturated with dry hydrogen chloride, and cooled in a dry ice-acetone bath. White crystalline ω-amino methylcaproate hydrochloride, m.p. 110°-112° was obtained. This is a known compound and its structure was verified by NMR, IR and mass spectographic analysis.

EXAMPLE 6

Although Raney nickel is the preferred catalyst for the hydrogenation reaction, there are many other metallic catalysts which are quite satisfactory. The following catalysts were found effective to varying degrees in achieving reduction of the oximino group in the procedure of Example 5.

| Catalyst | Yield, % |
|---|---|
| Raney cobalt | 94 |
| Randy copper | 98.5 |
| Copper chromite | 60 |
| 5% rhodium on carbon | 80 |
| Palladium on carbon | 83 |

EXAMPLE 7

In this example, the ω-aminohexanoate methyl ester (ω-amino methyl caproate) prepared by the hydrogenation reaction of the present invention, was cyclized.

10 Parts of ω-amino methyl caproate, the product of Example 4, were added to 30 parts of water and the mixture sealed in a pressure vessel which was then heated with agitation to 270°C. for 15 minutes. The reaction mixture was then cooled to 90°C. and fractionally distilled to give an essentially quantitative yield of ε-caprolactam.

Since certain changes may be made in applying the above method without departing from the scope of the invention, it is intended that all matter contained in the above description shall be interpreted as illustrative and not in a limiting sense.

We claim:

1. In a process of nitrosating ketones at a C-C bond adjacent to the ketonic carbon: the combination of features resulting in cleavage to produce a terminal carboxylic acid ester group and an oxime group, which comprises admixing (1) a ketone of the formula

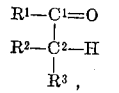

wherein $R^1$ and $R^2$ can be each a saturated aliphatic or cyclic hydrocarbon radical containing 1 to 20 carbon atoms, or together form a saturated cyclic hydrocarbon radical, having 5-12 carbon atom in the ring and $R^3$ is H or $R^1$; and (2) a nitrosating agent at about equimolar proportion with the ketone; and (3) an alcohol at molar proportion at least about equal to the ketone, in a polar aprotic solvent having a dielectric constant of at least about 12 for a time sufficient to effect scission at the $C^1$-$C^2$ carbon bond, to produce a carboxylic ester group at the $C^1$ carbon, and an oxime group at the $C^2$ carbon.

2. The method of cleaving ketones of claim 1 wherein the polar aprotic solvent is sulfur dioxide.

3. The method of cleaving ketones of claim 1 wherein the polar aprotic solvent is selected from the group consisting of sulfolane, nitromethane and nitrobenzene.

4. The method of cleaving ketones of claim 1 wherein the nitrosating agent is selected from the group consisting of nitrosyl chloride, nitrosyl bromide, nitrosyl fluoride, nitrosyl iodide, nitrosyl formate, nitrosyl acetate and nitrosyl fluoborate.

5. The method of cleaving ketones of claim 1 wherein the nitrosating agent is formed by reaction of an alkyl nitrite and a strong mineral acid.

6. The method of cleaving ketones of claim 1 wherein an alkyl nitrite is formed in situ, and in the presence of a strong acid forms the corresponding nitrosyl compound as a nitrosating agent.

7. The method of claim 6 wherein the alkyl nitrite is formed in situ by introducing an oxide of nitrogen and an alkyl alcohol into the reaction mixture and removing the water formed.

8. The method of cleaving ketones of claim 1 wherein the nitrosating agent is nitrosyl chloride.

9. The method of cleaving ketones of claim 1 wherein the alcohol is selected from the group consisting of aliphatic alcohols, cycloalkanols and aralkyl alcohols having from 1 to 12 carbon atoms.

10. The method of claim 9 wherein the alcohol is an aliphatic alcohol having from 1 to 5 carbon atoms.

11. The method of claim 1 wherein $R^1$ and $R^2$ are aliphatic radicals.

12. The method of claim 1 wherein $R^1$ and $R^2$ together form a cyclic hydrocarbon radical.

13. The method of cleaving ketones of claim 1 at a C-C bond adjacent to the ketone carbon, wherein the temperature of the reaction ranges from $-30°$ to $+50°C$.

14. The method of cleaving ketones of claim 1 in which the solvent is a mixture of liquid sulfur dioxide and an alcohol, and the reaction is carried out under substantially anhydrous conditions.

15. The method of claim 1 wherein the ketone is cyclohexanone, and the product is an $\omega$-hydroximino hexanoate ester.

16. The method of claim 15 wherein the alcohol has from 1 to 12 carbon atoms and is selected from the group consisting of alkanols, cycloalkanols, and aralkyl alcohols.

17. The process of claim 16 wherein the alkanol is methanol or ethanol.

18. The process of claim 16 wherein the nitrosating agent is selected from the group consisting of nitrosyl chloride, bromide, fluoride, iodide, formate, acetate, fluoborate.

19. The process of claim 16 wherein the nitrosating agent is an alkyl nitrite in the presence of a strong acid.

20. The process of claim 19 wherein the alkyl nitrite is formed in situ by introducing an oxide of nitrogen and an alkyl alcohol into the reaction mixture and removing water.

21. The process as claimed in claim 16 wherein the $\omega$-hydroximino hexanoate ester is hydrogenated in the presence of a reduction catalyst to produce the corresponding $\omega$-amino-hexanoate ester.

22. The process of claim 21 wherein said nitrosating agent is nitrosyl chloride and the reaction product is neutralized prior to the hydrogenation step.

23. The process as claimed in claim 21 wherein the hydrogenation is effected in the presence of at least sufficient liquid ammonia to dissolve the $\omega$-hydroximinohexanoate ester.

24. The process as claimed in claim 21 wherein said $\omega$-aminohexanoate ester is cyclized to produce $\epsilon$-caprolactam.

25. The process of claim 21 wherein the metallic catalyst is selected from the group consisting of Raney cobalt, Raney copper, copper chromate, and Raney nickel.

26. A process comprising:
a. nitrosating cyclohexanone in accordance with claim 1 in the presence of an aliphatic alcohol having 1 to 5 carbon atoms, inclusive, and liquid sulfur dioxide, at a temperature ranging between about $-30°$ to $+50°C$. to produce $\omega$-hydroximino hexanoate ester as a reaction product;
b. hydrogenating the $\omega$-hydroximino hexanoate ester in the presence of a metallic catalyst at a temperature ranging from about 25°C. to 300°C. and with hydrogen introduced at pressures between about 100 and 10,000 psi, in the presence of at least sufficient liquid ammonia to dissolve the $\omega$-hydroximino hexanoate ester, to afford the corresponding $\omega$-aminohexanoate ester; and
c. cyclicizing said $\omega$-aminohexanoate ester at a temperature ranging from 250°C. to 350°C. to afford $\epsilon$-caprolactam.

* * * * *

PO-1050
(5/69)

UNITED STATES PATENT OFFICE
CERTIFICATE OF CORRECTION

Patent No. 3,857,510                Dated December 31, 1974

Inventor(s) Milorad M. Rogic and Robert Furhmann

It is certified that error appears in the above-identified patent and that said Letters Patent are hereby corrected as shown below:

Column 5, line 50, delete formula (III) and insert said formula after line 28, column 5, after "solution thereof."

Column 8, line 17, Example 6, "Randy" should be -- Raney --.

Claim 1, column 8, line 48, "$R^2$ can be each" should read -- $R^2$ can each be --.

Claim 1, column 8, line 51, "atom" should be -- atoms --.

Signed and sealed this 4th day of March 1975.

(SEAL)
Attest:

RUTH C. MASON
Attesting Officer

C. MARSHALL DANN
Commissioner of Patents
and Trademarks